United States Patent [19]

Bergmann

[11] 4,144,515

[45] Mar. 13, 1979

[54] ADJUSTABLE CONDITION RESPONSIVE CONTROL

[75] Inventor: Richard L. Bergmann, Columbus, Ohio

[73] Assignee: Ranco Incorporated, Columbus, Ohio

[21] Appl. No.: 767,182

[22] Filed: Feb. 9, 1977

[51] Int. Cl.² .......................................... H01H 37/12
[52] U.S. Cl. ..................................... 337/319; 337/387
[58] Field of Search ............... 337/319, 318, 312, 311, 337/310, 309, 308, 307, 306, 387, 388, 389, 390, 118, 116, 115, 114

[56] References Cited

U.S. PATENT DOCUMENTS

| 3,103,568 | 9/1963 | Liebermann et al. | 337/319 |
| 3,177,321 | 4/1965 | Grimshaw | 337/319 |
| 3,386,064 | 5/1968 | Russell | 337/387 |

Primary Examiner—Harold Broome
Attorney, Agent, or Firm—Watts, Hoffmann, Fisher & Heinke Co.

[57] ABSTRACT

A condition responsive control is disclosed which includes a support housing, a snap switch supported by the housing having first and second control conditions for governing operation of a condition altering device, a condition responsive actuator system supported by the housing remote from the switch and a lever system coacting between the switch and the actuator for enabling operation of the switch between its conditions.

The actuator coacts with the lever system via a lost motion mechanism which enables the establishment of a differential between the sensed condition levels at which the switch is operated. The lost motion mechanism is adjustable to alter the sensed condition levels at which the switch is operated throughout a relatively wide range and is also adjustable to permit the extent of the differential to be changed.

19 Claims, 4 Drawing Figures

U.S. Patent  Mar. 13, 1979  4,144,515
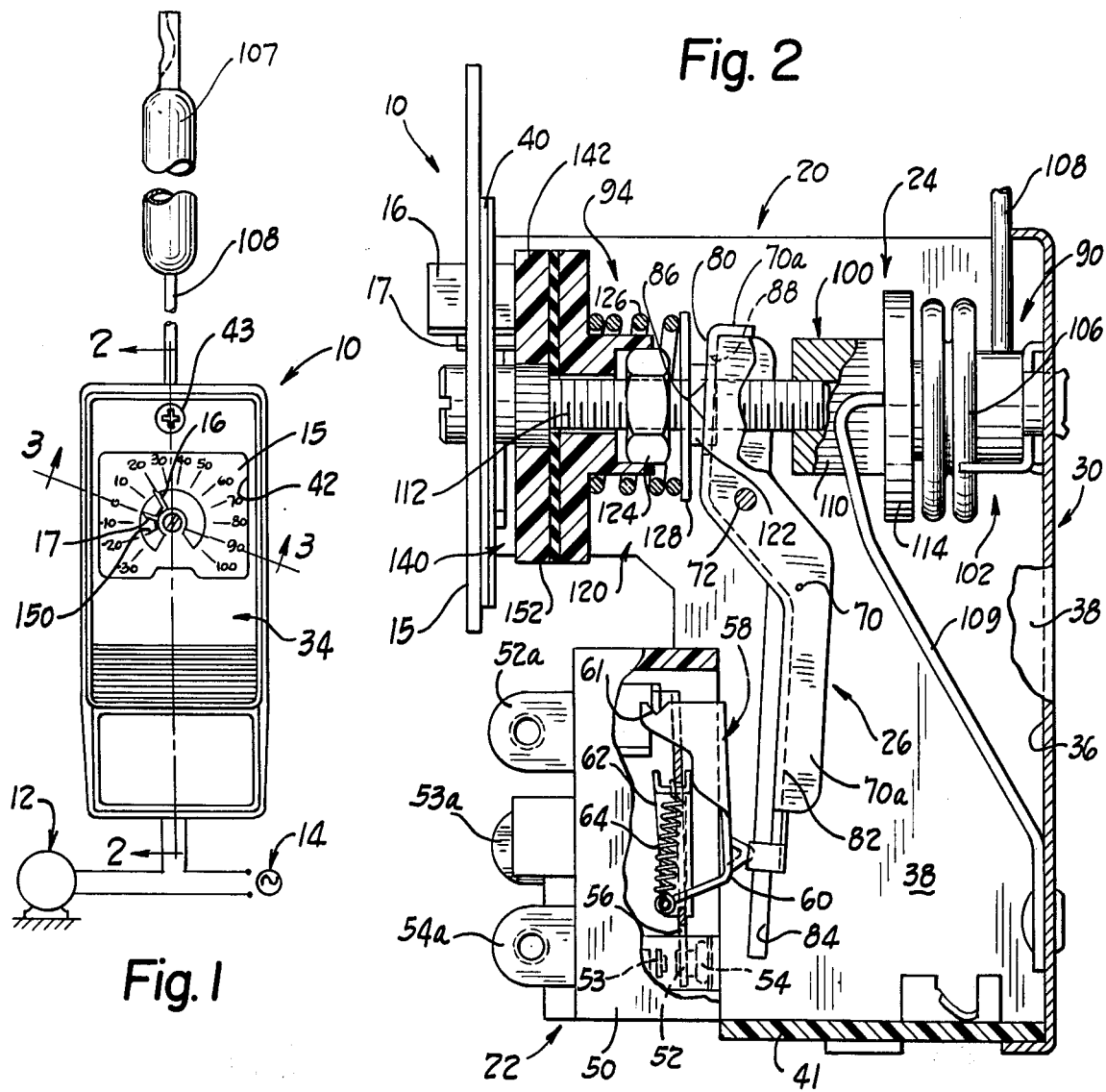
Fig. 1
Fig. 2
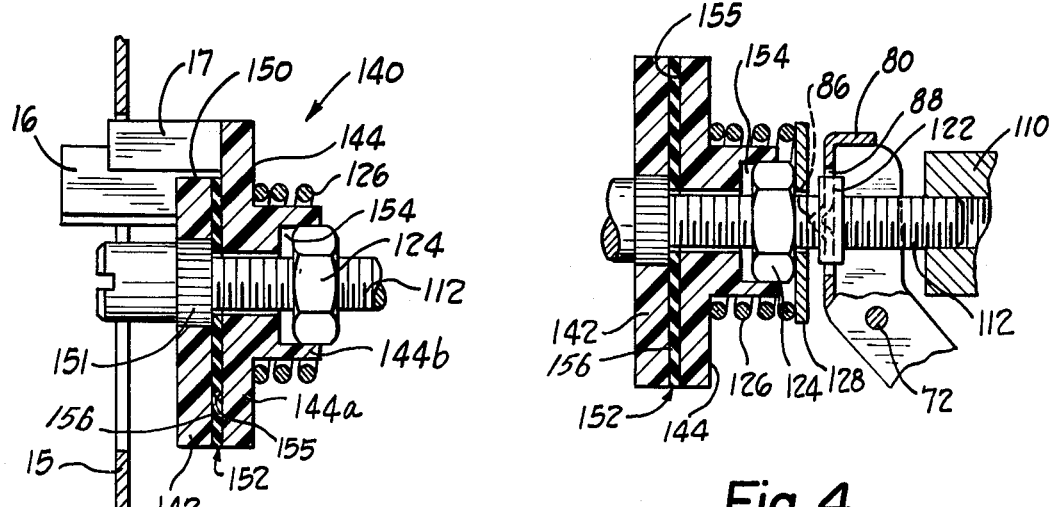
Fig. 3
Fig. 4

ADJUSTABLE CONDITION RESPONSIVE CONTROL

BACKGROUND OF THE INVENTION

FIELD OF THE INVENTION

The prior art has proposed the construction of temperature or pressure responsive control units which can be adjusted to respond to sensed condition levels anywhere within a relatively wide range of condition levels. Temperature responsive control units of this kind are particularly useful as replacements for malfunctioning original equipment control units in various types of heating or cooling equipment. The equipment serviceman can install and adjust a multiple purpose control unit to duplicate the operation of an original control unit without having to order a particular replacement unit or maintain an inventory of a large number of replacements for original control units. The availability of multiple purpose control units has tended to reduce maintenance expenses and the extent of the down time of heating or cooling equipment caused by original control unit malfunctions.

Prior art temperature controls of the character referred to have been required to operate reliably across relatively wide temperature ranges (for example, from around −20° F. to 100° F. or more). Moreover, they have frequently had to provide the capability of adjusting operating temperature differentials. For example, where a control is provided for a food freezer, refrigeration system operation may be initiated when the sensed freezer compartment temperature rises to 10° F. and terminated when the sensed temperature is reduced to −20° F. The same control, if installed in a beverage cooler, would be required to initiate refrigeration system operation at a sensed temperature of about 40° F. and terminate the refrigeration system operation at around 32° F. The identical control might be installed to govern operation of a heater unit which is turned on at 68° F. and turned off at 72° F. In short, these multiple purpose control units have had to be capable of use in various enviornments having widely differing high and low temperature "event" requirements depending upon the application involved.

The prior art control units have had several disadvantages. In the first place in order to provide necessary versatility the construction of these devices has been relatively complicated. Some units have employed range and differential adjusting mechanisms having multiple springs which must coact consistantly through the operating range of the control and provide for accurately adjustable control "event" condition levels in order for the control unit to operate satisfactorily. Fabrication, assembly and calibration of such units has been difficult and resulted in relatively significant unit costs while the complexity of the construction has tended toward unreliable performance.

Some prior art control units have included a control switch, a condition responsive actuator and a lever for transmitting actuator forces to the control switch. In addition these control units have been provided with various mechanisms by which the response of the units to sensed conditions can be adjusted. In most prior art controls of this character the switch operating levers have been acted upon by relatively heavy spring and actuator forces which must be delicately balanced to assure proper control operation. Separate, relatively complex mechanisms for range and differential adjustments have been proposed, all of which tended to reduce the accuracy, reliability and ease of adjusting the controls while increasing the difficulty of their manufacture and their cost. In one proposal, for example, the switch operating lever has a resiliently shiftable pivot axis whose location is governed according to the interactions of multiple springs associated with complicated adjusting mechanisms.

SUMMARY OF THE INVENTION

The present invention provides a new and improved multiple purpose condition responsive control unit which is constructed and arranged to provide convenient adjustment of the condition levels to which the control responds, provides an effective mechanism for enabling the control to respond to predetermined differential condition levels and yet whose construction is relatively simple and easily manufactured.

A condition responsive control embodying the invention comprises a support housing, a control switch attached to the housing for governing operation of a condition altering device, a condition responsive actuator mechanism and a lever system reacting between the actuator and the switch.

The control switch is operated between first and second conditions in which the condition altering device is energized and deenergized, respectively. The switch comprises a movable switch operating member and an operating member biasing arrangement for exerting biasing force on the operating member. The member biasing force is greater when the switch is in one condition than when the switch is in its other condition. The switch operating member reacts against the lever system so that the operating member biasing force is opposed by the actuator mechanism via the lever system.

The actuator mechanism comprises an actuating member which is moved in response to changes in a sensed condition and a lost motion mechanism between the actuating member and the lever system. The condition responsive motion of the actuating member is transmitted to the lever system via the lost motion mechanism which establishes the extent of the differential sensed condition levels to which the control responds. The lost motion mechanism includes first and second abutments movable with the actuating member to enable motion of the lever system and a lever system biasing unit reacting against said lever system in opposition to the switch biasing force for enabling movement of the lever system by the first abutment when the switch is in one condition and movement of the lever system by the other abutment when the switch is in its other condition.

The preferred control is adjustable so that the levels of the sensed condition to which it responds can be changed within a predetermined relatively wide range. An adjusting mechanism forming part of the actuator mechanism is manually operated to shift the locations of the abutments relative to the housing so that the condition level response is altered according to the degree of abutment shifting.

The preferred control further enables easy adjustment of the extent of the differential between the condition levels to which the control responds by permitting the space between the abutments to be changed. One of the abutments is shiftably attached to the actuating member so that it can be moved toward and away from the other abutment. The movable abutment is associated with a differential adjusting member which is manually movable relative to the actuating member to shift the abutment location.

In the disclosed embodiment of the control the actuating member includes a shaft which is threaded to a nut-like supporting member. A second manually movable range adjusting member is associated with the shaft so that when the range adjusting member is moved the shaft is threaded into or out of the supporting member for adjusting the condition level to which the control responds. The first and second adjusting members are drivingly engagable by a clutch arrangement which functions so that the differential adjusting member is moved by the range adjusting member. Thus when the condition level response is adjusted the differential tends to remain unchanged. When the differential adjusting member is moved the clutch arrangement is ineffective to transmit its motion to the range adjusting member.

In its preferred construction the new control is thermally responsive and is usable to control the operation of temperature altering equipment, i.e. heaters, refrigeration units, fans, etc. The actuator mechanism of the preferred control construction comprises an expansible chamber assembly including a bellows supported by the housing for shifting the actuating member in response to temperature related volume changes of a fluid confined in the expansible chamber assembly.

Other features and advantages of the present invention will become apparent from the following detailed description of a preferred embodiment made in reference to the accompanying drawing.

BRIEF DESCRIPTION OF THE DRAWING

FIG. 1 is an elevational view of a condition responsive control embodying the invention associated with a condition altering device which is schematically shown;

FIG. 2 is a cross sectional view of part of the control of FIG. 1 seen approximately from the plane indicated by the line 2—2 of FIG. 1;

FIG. 3 is a cross sectional view of part of the control of FIG. 1 seen approximately from the plane indicated by the line 3—3 of FIG. 1; and FIG. 4 is a fragmentary view of a portion of FIG. 2 with parts illustrated in different relative positions.

DESCRIPTION OF A PREFERRED EMBODIMENT

A condition responsive control 10 constructed according to the invention is illustrated by the drawings. A control constructed according to the principles of the present invention can respond to sensed temperature or pressure conditions but in the preferred and illustrated embodiment of the invention the control 10 is constructed and arranged to respond to first and second sensed temperature levels to control the operating condition of temperature altering equipment with which the control is associated. The control 10 is a multiple purpose thermostatic control in that it is constructed to function satisfactorily in many environments because it can be adjusted to respond to sensed temperature levels anywhere throughout a wide temperature range. The new control is also adjustable to enable increasing or decreasing the extent of the differential between sensed temperature levels to which the control responds.

The control 10 can be employed to operate heating or cooling equipment, but for the purposes of this description the control is illustrated and described as it would be installed and adjusted to control the temperature within a food freezer compartment, not illustrated. FIG. 1 illustrates the control 10 connected in a circuit with a refrigerant compressor drive motor 12 and an electrical power supply 14. The control 10 completes and interrupts the power supply circuit to the motor 12 in response to sensing predetermined "cut-in" and "cut-out" temperatures, respectively, in the freezer compartment.

The control 10 includes a dial-like face plate 15 bearing indicia representing temperature levels and is set to control the compressor motor 12 by manually aligning shiftable temperature selector fingers 16, 17 with dial face indicia representing desired compressor cut-in and cut-out temperature levels. The illustrated control 10 is adjustable to operate through a temperature range from $-30°$ F. to $100°$ F. and is illustrated as being set so that when the freezer compartment temperature reaches $20°$ F. the control 10 completes the compressor motor energizing circuit (i.e. $20°$ F. is the "cut-in" temperature). The motor 12 operates the refrigeration compressor to reduce the compartment temperature until the temperature reaches $0°$ F. The control 10 then interrupts the energizing circuit to deenergize the motor 12 and discontinue operation of the refrigeration system (i.e. $0°$ F. is the "cut-out" temperature).

Referring now to FIG. 2, the control 10 comprises a support housing assembly 20, a control switch unit 22, a condition responsive actuator mechanism 24 and a lever system 26 reacting between the actuator mechanism 24 and the control switch unit 22 to govern operation of the control switch.

The support housing 20 is formed by a sheet metal body 30 having the face plate 15 attached to it and a decorative molded plastic cover 34. The body 30 is formed by a base section 36 and integral side plates 38 which are bent to extend parallel to each other from the base section 36. The preferred base section 36 has mounting tabs which extend beyond the planes of the side plates 38 and by which the control is anchored to a wall, or machine chassis, etc. by screws, rivets or the like. The side plates 38 are substantially identical and are bent to define flanges 40 to which the face plate is attached by suitable fasteners such as screws or rivets, not shown. An electrically non-conductive dielectric plate 41 is secured between the side plates 38 at one end of the body 30 adjacent the control switch 22 to substantially close that end of the support housing.

The face plate 15 is a generally rectangular piece of sheet metal having a roughly sector-shaped dial opening formed in it around which the temperature level indicia are disposed. The cover 34 is molded from a dielectric plastic material, fits over the body 30 and the face plate 15 and is formed with an aperture 42 through which the face plate 15 with its indicia is visible. The aperture enables access to and manual position adjustment of the fingers 16, 17. The cover 34 is detachably connected to the support housing assembly by a screw 43 (See FIG. 1).

The control switch unit 22 is preferably a snap acting switch having first and second control conditions for governing operation of the motor 22. The switch is preferably a so called "high rated" switch in that it is capable of carrying and switching significant current levels without damage to its contacts. When the switch 22 is in one condition the energizing circuit for the motor 12 is completed while operation of the switch 22 to its other condition interrupts the energizing circuit.

The switch 22 is characterized in that it is self biased to a "normal" condition and when the switch is in its normal condition its reaction force against the lever system is greater than when the switch is in its other condition. It should be understood that there are a number of types of switch constructions having the operating characteristics referred to and that the illustrated switch 22 is disclosed by way of example in a preferred embodiment. The switch unit 22 includes a dielectric plastic-like housing 50, a moving switch contact 52, fixed switch contacts 53, 54, a flexible supporting blade 56 for the moving contact 52, and a toggle mechanism 58 for snap moving the blade 56 to move the contact 52 between the contacts 53 and 54.

The switch housing 50 is structured to support the switch contacts 52, 54 and the blade 56 along with terminal posts 52a, and 54a by which the respective contacts are connected into the energizing circuit for the motor 12. The third contact 53 and its associated terminal post 53a are also supported by the housing but are not electrically connected to the energizing circuit for the motor 12 in the disclosed embodiment of the invention. The contacts 52, 53 are engaged when the motor energizing circuit is interrupted.

The switch housing 50 is rigidly supported by the housing body 30 so that the switch position is fixed relative to the lever system and the actuator mechanism. The preferred switch housing 50 is formed with laterally projecting lugs (not shown) which extend through openings in the side plates 38. The side plates 38 are deformed by a staking operation to crimp them firmly against the lugs and fix the switch 22 to the support housing.

The toggle mechanism 58 is formed by a switch operating member 60 which is pivotally moved relative to the switch housing 50 by the lever system 26, a toggle member 62 pivoted on the contact blade 56, and a switch biasing element 64 reacting between the toggle member and the switch operating member to snap move the contact 52 between the contacts 53, 54, in response to movement of switch the operating member 60. The switch operating member 60 supported for pivotal motion relative to the switch housing 50 on a knife edge structure 61 and when the member 60 is pivoted from the position shown by FIG. 2 towards the base 36 (i.e. pivoted counterclockwise as viewed in FIG. 2) the line of action of the biasing element 64 shifts and eventually the toggle member 62 is moved "over center" and abruptly toggled by the switch biasing force. Accordingly the contact blade 56, upon which the toggle member is pivoted, is snap moved to engage the contacts 52, 53 and interrupt the motor energizing circuit. When the member 60 is pivoted in the opposite direction the toggling action is reversed resulting in the contacts 52, 54 being snapped closed after a given amount of movement the member 60.

The spring 64, which is preferably a coil spring, constantly urges the switch operating member towards its position where the contacts 52, 53 are closed (i.e. counterclockwise as viewed in FIG. 2) and is opposed by the lever system 26. The switch biasing force which must be opposed by the lever system 26 is greater when the contacts 52, 53 are closed than when the contacts 52, 54 are closed.

The illustrated switch unit 22 is of a well known type and is described and illustrated in detail by U.S. Pat. No. 2,651,690 to which reference should be made for a more complete understanding of its operation. It should be understood that if the control 10 were to be installed to control the operation of a heater of some sort, the switch terminal posts 52a, 53a would be connected in the control circuit for the heater so that the heater control circuit would be completed when the contacts 52, 53 close and interrupted when the contacts 52, 54 close.

The lever system 26 is formed by a lever member 70 supported for pivotal movement about a fixed axis and a lever member pivot pin 72 anchored between the housing side plates 38. The switch unit 22 and the actuator mechanism 24 exert opposing forces on the lever system 26 which reacts between them and effects operation of the switch unit in response to operation of the actuator mechanism.

The lever member 70 is preferably formed by a sheet metal stamping defining an elongate body having bent marginal stiffening flanges 70a. The flanges 70a define aligned transverse bearing openings through which the pivot pin 72 extends. As illustrated, the lever member pivot axis is disposed between the actuator mechanism 24 and the switch unit 22.

The lever member 70 defines a lever body portion 80 projecting from the pivot pin axis toward the actuator mechanism 24 and a lever body portion 82 extending oppositely from the pin toward the switch 22. A switch energizing dielectric pad 84 is staked to the body portion 82 for engagment with the switch operating member 60. Actuating force is transmitted from the lever member 70 to the switch operating member 60 via the pad 84 which prevents the establishment of electrical continuity between the switch unit 22 and the support housing 20 or any electrically conductive parts of an actuator mechanism.

The lever body portion 80 bears upon the actuator mechanism 24 and is preferably formed with an embossed knife edge 86 extending on opposite sides of a through opening 88. The knife edge enables the efficient transmission of actuating forces between the mechanism 24 and the lever system 26.

The actuator mechanism 24 is defined by an actuator assembly 90 and a lost motion mechanism 94 by which the actuator assembly 90 transmits motion to the lever system so that the switch 22 is operated at differential temperature levels. The actuator assembly 90 includes an actuating member 100 which moves relative to the lever body portion 80 in response to sensed temperature changes and an expansible chamber device 102 moved the actuating member 100. The preferred expansible chamber device 102 is formed by a metal bellows 106, a bulb 107 (See FIG. 1) and a capillary tube 108 which together form a sealed chamber which is filled with a suitable liquid whose volume changes as a known function of its temperature. The bulb 107 is, in effect, a temperature sensor and is placed in the freezer compartment to monitor the temperature there. The bellows 106 is extensible and retractible in relation to changes of the liquid temperature in the bulb 107. The base of the bellows is fixed to the housing base 36 (for example by a staking operation) and the lever member end portion 80 is interposed between the bellows and the dial plate 15. When the bellows extends or contracts it does so along a line of action which extends on the longitudinal axis of the bellows and through the lever member opening 88.

When the sensed temperature increases the head end of the bellows 106 moves toward the lever member in relation to the extent of the bulb temperature change. As the temperature of the bulb 107 is reduced the liquid fill volume is reduced accordingly and the head end of the bellows tends to retract from the lever member. A return spring 109 reacts between the base 36 and the bellows 106 to exert a collapsing force on the bellows. The spring 109 assures that the bellows retraction closely follows the liquid fill volume reduction.

The actuating member 100 is formed by a nut-like fitting 110 secured to the head end of the bellows 106 and a threaded shaft 112 which is threaded into the fitting 110 and projects through the lever member opening 88 along the line of action of the bellows. The shaft 112 preferably extends through the plane of the dial plate 15 and has a slotted end to permit factory calibration of the control 10 by threading the shaft into or out of the fitting 110 during manufacture of the control. The return spring 109 is preferably a leaf spring which is riveted to the support housing base 36 and bears on a shoulder 114 of the fitting 110 so that the spring force is transmitted to the bellows 106 via the fitting 110.

The lost motion mechanism 94 effectively transmits actuating force from the actuator mechanism 24 to the switch unit 22 via the lever system 26 while enabling lost motion between the lever system and the actuator mechanism so that switch unit operation occurs at differential sensed temperatures. The mechanism 94 comprises a lever biasing unit 120 and cooperating abutments 122, 124 which are movable with the actuating shaft 112 to control positioning of the lever system in accordance with sensed temperature.

The biasing unit 120 comprises a spring 126 and a bearing member 128. The spring 126 is lightly compressed to react against the lever system 26 via the lever engaging bearing member 128 so that the moment applied to the lever system by the biasing unit 120 opposes the moment applied to the lever system by the switch biasing spring 64. The spring 126 is selected so that the moment applied by it to the lever system 26 exceeds the moment applied to the lever system by the switch biasing force when the switch is in one condition (i.e. when the contacts 52, 53 are engaged) but not when the switch is in its other condition (when the contacts 52, 54 are engaged). This coaction between the switch 22 and the lever biasing unit 120 enables lost motion between the lever system and the actuator mechanism whenever the switch unit 22 changes conditions.

The lever engaging member 128 is preferably formed by a flat annular washer-like member which extends loosely about the shaft 112 so that it is freely movable axially with respect to the shaft. The washer-like member 128 is urged by the spring 126 into line-contact with the knife edge 86 on the lever body portion 80 to assure a low friction engagement.

When the switch unit 22 is in its condition where the contacts 52, 53 are engaged the switch biasing force acts on the lever system so that the spring 126 is compressed and the abutment 124 is engaged by the bearing member 128. Positioning of the lever system is then controlled according to the location of the abutment 124 (See FIG. 4). When the abutment 124 moves in either direction along the line of action of the bellows the bearing member 128 and the lever end portion 80 are constrained to follow it.

When the switch 22 is in its other condition the spring 126 overcomes the switch biasing force applied to the lever system and urges the bearing member 128 into engagement with the abutment 122. The lever system position is then governed by movement of the abutment 122. This condition of the control 10 is illustrated by FIG. 2.

The abutments 122, 124 are connected to the shaft 112 with the bearing member 128 interposed. The diametrical extents of the abutment members 122, 124 are larger than the inner diameter of the member 128 so that the bearing member 128 is readily engagable by either abutment. The abutment 122 is preferably a collar-like member which is fixed to the shaft 112 (for example by brazing or welding). The abutment 124 is preferably formed by a nut which is threaded onto the shaft 112 and is freely threadable along the shaft after assembly.

Referring to FIG. 2 of the drawings the control 10 is shown in its condition in which the sensed freezer compartment temperature has reached 0° F. and the compressor motor 12 has been de-energized. Accordingly, the switch contacts 52, 54 are engaged and the lever biasing unit spring 126 has expanded against the action of the switch biasing spring 64 so that the bearing member 128 is urged into engagement with the abutment 122. As the sensed freezer compartment temperature gradually rises the bellows 106 extends and the abutment 122, along with the bearing member 128 engaged by it, moves toward the dial plate 15 allowing the lever system 26 to be pivoted (counterclockwise as viewed in FIG. 2) by the action of the switch biasing spring. When the sensed temperature reaches 20° F. the extent of lever system movement enabled by the abutment 122 is sufficiently great that the switch 22 snaps to its other condition to engage the contacts 52, 53 and energize the compressor motor 12.

Operation of the switch 22 to close the contacts 52 53 results in the switch biasing spring moment exerted on the lever system 26 overcoming that exerted on the lever system by the biasing unit spring 126. Accordingly, the spring 126 is compressed by the lever system 26 and the lever system overtravels until the washer member 128 engages the abutment nut 124, (See FIG. 4). As the compressor motor 12 operates the sensed freezer compartment temperature is reduced which results in the bellows 106 retracting and the abutment nut 124 being moved to shift the lever system 26 about its axis to depress the switch operating lever 60 (i.e. clockwise as viewed in the drawing).

When the freezer compartment temperature reaches 0° F. the lever system 26 has been shifted sufficiently by the abutment 124 that the switch 22 snaps to its other condition and the compressor motor 12 is de-energized again. At this juncture the biasing unit spring 126 again overcomes the moment applied to the lever system by the switch biasing spring 64 and the member 128 is re-engaged with the abutment 122 (See FIG. 2).

It should be appreciated that the differential between the high and low temperature switch operating events is governed by the positioning of the abutments relative to each other (i.e. the extent of the gap between the abutments) while the levels at which the switch operating events occur within the range of the control are governed in accordance with the positioning of the abutments 122, 124 relative to the bellows 106. Both the response level of the control within its range and the differential between the high and low temperature control events are adjustable. In the preferred control unit the range and differential adjustments are effected by an adjusting mechanism 140 which includes range and differential adjusting members 142, 144 carried by the shaft 112.

Referring to FIGS. 2 and 3, the range adjusting member 142 is manually movable to shift the positions of the abutments 122, 124 relative to the bellows 106 for simultaneously adjusting the sensed temperature levels to which the control 10 responds. The illustrated range adjusting member 142 is fixed to the shaft 112 and is preferably formed by a disc-like generally annular body having a sector shaped recess 150 (FIG. 1) along one portion of its periphery. The temperature adjusting finger 16 is formed integrally with and extends from the member body at one end of the recess 150. The range adjusting body is pressed onto spline-like teeth 151 formed on the shaft 112 between its threaded shank and the projecting slotted end. The range adjusting member and the shaft are thus fixed against relative rotation. When the finger 16 is manually shifted relative to the face plate 15 about the axis of the shaft 112 the range adjusting member is rotated to thread the shaft 112 relatively into or out of the fitting 110. This effectively shifts the shaft 112 axially relative to the bellows 106 and simultaneously adjusts the position of the abutment 122 along the line of action of the bellows.

The differential adjusting member 144 governs the position of the nut-like abutment 124 relative to the shaft 112 and is drivingly engagable with the adjusting member 142 by a friction clutch arrangement 152. The abutment 124 is shifted simultaneously with the abutment 122 when the range adjusting member 142 is rotated to change the temperature levels to which the control 10 responds.

The member 144 is preferably formed by a disc-like annular body 144a which extends loosely about the shaft 112 and a collar 144b extending from the body toward the bellows 106. The collar 144b has a central polygonal recess 154 which is shaped to conform to the shape of the nut-like abutment 124 and in which the nut-like abutment is slidably received. When the member 144 is rotated about the shaft axis the nut 124 is constrained to rotate with it but the member 144 and the nut 124 remain freely movable relative to each other in the direction of the shaft axis so that the nut can shift axially relative to the collar when the member 144 turns the nut on the shaft.

The friction clutch arrangment 152 insures that rotation of the range adjusting member 142 rotatably drives the differential adjusting member 144. This results in the nut-like abutment 124 shifting axially with the shaft and the abutment 122 to an adjusted position determined by the extent of rotation of the range adjusting member. The differential adjusting member 144 preferably has an annular face 155 which confronts the range adjusting member 142. A rubber-like sheet of material forming a clutch member 156 is interposed between the face 155 and the range adjusting member 142 to enable the range adjusting member 142 to frictionally drive the differential member 144 when the member 142 is manually rotated.

In the preferred embodiment the lever biasing spring 126 is seated against the differential adjusting member 144 and urges the member 142, 144 into frictional driving engagement with the interposed clutch member 156. The spring loading is relatively light but the member 144 and the nut 124 present only slight torsional resistance to rotation by the member 142. Thus when the member 142 is rotated to adjust the range response level, the member 144 is likewise rotated with the shaft 112 so that the position of the nut 124 remains unchanged relative to the position of the abutment 122.

This construction assures that the temperature response levels of the control can be changed without altering the control's differential.

The differential adjusting member 144 is manually rotated relative to the range adjusting member 142 to change the extent of the space between the abutments 122, 124 and thus change the differential of the control 10. When the differential adjusting member 144 is rotated the clutch arrangement 152 slips and the range adjusting member 142 tends to remain stationary. This enables the control differential to be altered without changing the general temperature response level. As illustrated by FIG. 3 the adjusting finger 17 is formed integrally with and projects from the differential adjusting member face 155 to about the plane of the dial plate 15 through the range adjusting member recess 150. The finger 17 is manually shiftable within the recess 150 to rotate the member 144. The manual pressure resulting from adjusting movement of the member 144 tends to declutch the members 142, 144 by overcoming the force of the biasing spring 126 and thus reducing the friction with the clutch member 156. In addition, rotation of the member 142 and its associated parts normally requires more torque than can be transmitted by the clutch member 156.

As a result, when the differential adjusting member 144 is manually rotated the abutment nut 124 is rotated relative to the shaft 112 to thread it along the shaft 112 relative to the abutment 122. The space between the abutments 122, 124 is thus changed to change the extent of the temperature differential to which the control 10 responds. It should be apparent that when the space between the abutments is increased the differential is increased because a greater amount of lever system overtravel is permitted when the switch 22 changes conditions.

It should be noted that because the nut 124 is axially slidable relative to the differential adjusting member 144 the member 144 remains in contact with the member 142 regardless of the control differential. Accordingly the biasing spring 126 is not compressed or extended as a result of the differential adjustment and the forces exerted by the spring 126 on the lever system remain consistent throughout the range of operation of the control.

The extent of the differential adjustment is limited by the circumferential extent of the adjusting member recess 150 and the lead of the threads on the shaft 112 and the nut 124. In the preferred control the differential can be adjusted to as much as 35 to 40° F. which is more than sufficient for most applications of a control such as the control 10.

While a single embodiment of the invention has been illustrated and described in considerable detail the present invention is not to be considered limited to the precise construction disclosed. For example, a control embodying the invention could be constructed for sensing and responding to fluid pressure changes; a different control switch, having the same general operating characteristics as the disclosed switch 22, could be employed, and/or, a different lever system could be used, such as a second or third class lever. Various other adaptations modifications and uses of the invention may become apparent to those skilled in the art to which the invention relates and the intention is to cover all such adaptations, modifications and uses which fall within the spirit or scope of the appended claims.

What is claimed is:

1. A condition responsive control comprising:
(a) a support housing;
(b) switch means supported by said housing and having first and second control conditions for controlling operation of a condition-altering device, said control switch means comprising a movable operating member and operating member biasing means exerting a biasing force on said operating member which is greater when said switch means is in one condition than when the switch means is in the one condition;
(c) condition responsive actuator means comprising an actuating member supported for movement relative to said housing in response to sensed changes in conditions;
(d) a lever system associated with said housing said housing including means supporting said lever system for pivotal movement and constraining said lever system against translational movement relative to said housing, said lever system coacting between said switch means and said actuator means for effecting operation of said switch means between its said conditions as a result of movement of said actuating member; and,
(e) said actuator means further including lost motion means between said actuating member and said lever system comprising:
  (i) a first abutment movable with said actuating member for enabling motion of said lever system;
  (ii) a second abutment movable with said actuator member for enabling motion of said lever system;
  (iii) biasing means coacting with said lever system and reacting in opposition to said switch operating member biasing means for enabling movement of said lever system by said first abutment member when said switch means is in one condition and by said second abutment member when said switch means is in said other condition.

2. A condition responsive control as claimed in claim 1 wherein said actuator means comprises an expansible chamber assembly including a bellows supported by said housing, said actuating member supported by and projecting from said bellows for motion in the direction of extent of said actuting member.

3. A condition responsive control comprising:
(a) a support housing;
(b) switch means supported by said housing and having first and second control conditions for controlling operation of a condition-altering device, said control switch means comprising a movable operating member and operating member biasing means exerting a biasing force on said operating member which is greater when said switch means is in one condition than when the switch means is in the other condition;
(c) condition responsive actuator means comprising an actuating member supported for movement relative to said housing, said actuating member comprising a shaft movable in the direction of its extent in response to sensed changes in conditions;
(d) a lever system supported by said housing for pivotal movement, said lever system coacting between said swtich means and said actuator means for effecting operation of said switch means between its said conditions as a result of movement of said actuating member; and,
(e) said actuator means further including lost motion means between said actuating member and said lever system comprising:
  (i) a first abutment fixed to said shaft and movable with said actuating member for enabling motion of said lever system;
  (ii) a second abutment movable with said actuator member for enabling motion of said lever system;
  (iii) structure supporting said second abutment for adjusting movement relative to said first abutment; and,
  (iv) biasing means coacting with said lever system and reacting in opposition to said switch operating member biasing means for enabling movement of said lever system by said first abutment member when said switch means is in one condition and by said second abutment member when said switch means is in said other condition.

4. The control claimed in claim 3 further including a fitting supporting said shaft for said condition responsive movement and structure connecting said shaft to said fitting to enable relative motion therebetween to adjust the positions of said first and second abutments relative to said lever system and thereby adjust the sensed condition levels to which the control responds.

5. The control claimed in claim 4 further including a range adjusting member connected to said shaft and manually movable to relatively move said shaft and said fitting.

6. The control claimed in claim 5 further including a differential adjusting member supported for manual movement relative to said shaft to effect relative adjusting movement between said second abutment and said shaft to change the differential of the control.

7. The control claimed in claim 6 further including clutch means between said range and differential adjusting members, said clutch means effective to drive said differential adjusting member from said range adjusting member when said range adjusting member is manually moved so that the control differential remains unchanged during adjustment of the range adjusting member.

8. A condition responsive control comprising:
(a) a support housing;
(b) control switch means fixed to said housing and operable between first and second conditions for enabling and disabling operation of a condition altering device;
(c) condition responsive actuator means supported by said housing at a location remote from said control switch means;
(d) a lever system reacting between said control switch means and said actuator means comprising a lever member supported by said housing for pivotal movement about an axis, said lever member defining a first portion extending from said axis toward said switch means and a second lever portion extending from said axis toward said actuator means;
(e) dial forming means supported by said housing, said second lever portion interposed between said actuator location and said dial forming means;
(f) said switch means comprising a switch operating member engaged by said lever system and switch biasing means biasing said operating member to engage said lever system with a force which is greater when said control switch means is in its first condition than when said control switch means is in its second condition;

(g) said actuator means comprising:
(i) a bellows attached to said housing and extensible and retractible with respect to said second lever portion;
(ii) an actuating member supported by said bellows and extending therefrom substantially to said dial means, said actuating member comprising a fitting attached to said bellows and a shaft-like member threaded to said fitting, said shaft-like member movable in the direction of its extent by said bellows in response to sensed condition changes;
(iii) first and second abutments connected to said shaft-like member, said abutments spaced apart from each other in the direction of extent of said shaft-like member;
(iv) lever biasing means comprising a bearing member engaging said second lever portion and a biasing element for exerting a force on said lever system via said bearing member which opposes the force exerted on the lever system by said control switch means, said abutment members respectively engaging said bearing member to transmit the motion of said actuating member to said control switch means via said lever system;
(v) said lever biasing element effective to overcome the opposing switch biasing force on said lever system and urge said biasing member into engagement with one of said abutments when said switch means is in one condition, said switch biasing force overcoming said lever biasing element force and urging said bearing member into engagement with said other abutment when said switch means is in said other condition; and
(vi) a range adjusting member attached to said shaft-like member for threading said shaft-like member into and out of said fitting to adjustably change the location of said abutments relative to said bellows and thereby change the sensed condition levels at which said switch means operates, said range adjusting member disposed adjacent said dial forming means and having a part coacting with said dial forming means to indicate a condition level at which the switch means is operated.

9. The control claimed in claim 8 wherein one of said abutments is threaded to said shaft-like member and further including a differential adjusting member for rotating said one abutment relative to said shaft-like member and adjusting the space between said abutments, said differential adjusting member supported adjacent said dial forming means and having a part coacting with said dial forming means to indicate a condition level at which said switch means is operated.

10. The control claimed in claim 9 further including a clutch arrangement between said range adjusting member and said differential adjusting member, said clutch arrangement effective to transmit motion of said range adjusting member to said differential adjusting member and ineffective to transmit motion of said differential adjusting member to said range adjusting member.

11. The control claimed in claim 8 wherein said bellows defines a sealed interior chamber and further including a bulb defining a substantially constant volume sealed chamber communicating with said bellows chamber by a capillary tube, said bellows chamber, bulb chamber and capillary tube filled with a liquid whose volume changes as a function of temperature so that said bellows expands and contracts in response to temperature changes in the liquid occupying said bulb chamber.

12. The control claimed in claim 8 further including spring means reacting between said housing and said bellows to oppose extension thereof.

13. A thermostatic control comprising:
(a) a support housing;
(b) control switch means fixed to said housing and operable between first and second control conditions;
(c) thermostatic actuator means for effecting operation of said control switch means;
(d) a lever system reacting between said switch means and said actuator means, said lever system comprising a lever member pivotally movable about an axis which is fixed relative to said housing to enable operation of said switch means between said control conditions;
(e) said control switch means comprising a switch operating member movable by said lever system between a first position wherein said switch means is in one condition and a second position when said switch means is in said other condition, and member biasing means for urging said switch operating member towards engagement with said lever system, said spring means urging said operating member with greater force when said switch means is in said first condition than when said switch means is in said second condition;
(f) said actuator means comprising an actuating member movable in response to sensed thermal changes to effect operation of said switch means via said lever system and a lost motion mechanism between said lever system and said actuating member, said lost motion mechanism comprising spaced motion transmitting abutments movable with said actuating member for enabling motion of said lever system in response to motion of said actuating member and lever biasing means for opposing motion of said lever system by said switch biasing means, said switch and lever biasing means reacting via said lever system so that movement of said lever system is governed according to movement of one of said abutments when said switch means is in its first condition and according to movement of the other abutment when said switch means is in said second condition, said switch means operated from said first to said second condition at a sensed temperature level which is different from the sensed temperature level at which said switch is operated from said second to said first condition.

14. The control claimed in claim 13 further including a range adjusting member actuable to shift said abutments relative to said housing to adjust a sensed temperature level at which said switch means is operated from one condition to the other.

15. The control claimed in claim 14 wherein said actuating member comprises a threaded shaft-like member and a supporting fitting into which said shaft-like member is threaded, said range adjusting member fixed to said shaft-like member and rotatable to thread said shaft member into or out of said support fitting to shift the location of said abutments.

16. The control claimed in claim 13 where one of said abutments is adjustably movable with respect to said actuating member to change the differential between sensed temperatures at which said control switch is operated and further including a differential adjusting member supported by said actuating member for movement with respect thereto, said differential adjusting member operatively related to said one abutment to adjustably move said one abutment relative to the other abutment.

17. The control claimed in claim 13 wherein said lever biasing means comprises a bearing member engaging said lever system and a spring member urging said bearing member toward engagement with said lever system, said bearing member engagable by said abutments to enable movement of said lever system in response to movement of said actuating member.

18. The control claimed in claim 13 wherein said lever system includes a first lever portion projecting from said axis for engagement with said switch means and a second lever portion projecting from said axis oppositely from said first lever portion, said actuating member extending in said housing in a direction transverse to said second lever portion and movable in the direction of its extent in response to sensed temperature changes.

19. The control claimed in claim 18 wherein said actuator means further includes a bellows attached to said housing and extensible and retractible in response to sensed temperature changes, said actuating member supported by said bellows for movement thereby and said lever biasing means supported by said actuating member with said second lever portion interposed between said lever biasing means and said bellows.

* * * * *